United States Patent
Gamage et al.

(10) Patent No.: US 10,616,098 B2
(45) Date of Patent: *Apr. 7, 2020

(54) APPARATUS AND METHODS FOR FORWARDING DATA PACKETS CAPTURED FROM A NETWORK

(71) Applicant: Keysight Technologies Singapore (Sales) Pte. Ltd., Singapore (SG)

(72) Inventors: Nimal K. K. Gamage, Fort Collins, CO (US); Richard B. Whitner, Fort Collins, CO (US); Thomas G. Bartz, San Antonio, TX (US)

(73) Assignee: KEYSIGHT TECHNOLOGIES SINGAPORE (SALES) PTE. LTD., Singapore (SG)

(*) Notice: Subject to any disclaimer, the term of this patent is extended or adjusted under 35 U.S.C. 154(b) by 329 days.

This patent is subject to a terminal disclaimer.

(21) Appl. No.: 15/012,801

(22) Filed: Feb. 1, 2016

(65) Prior Publication Data

US 2016/0226752 A1 Aug. 4, 2016

Related U.S. Application Data

(63) Continuation of application No. 12/533,957, filed on Jul. 31, 2009, now Pat. No. 9,270,542.

(51) Int. Cl.
*H04L 12/725* (2013.01)
*H04L 12/751* (2013.01)
(Continued)

(52) U.S. Cl.
CPC ........ *H04L 45/3065* (2013.01); *H04L 43/028* (2013.01); *H04L 43/106* (2013.01);
(Continued)

(58) Field of Classification Search
CPC combination set(s) only.
See application file for complete search history.

(56) References Cited

U.S. PATENT DOCUMENTS 5,343,473 A 8/1994 Cidon et al.
5,867,763 A 2/1999 Dean et al.
(Continued)

FOREIGN PATENT DOCUMENTS

WO WO 2011/133711 A2 10/2011

OTHER PUBLICATIONS

Applicant-Initiated Interview Summary for U.S. Appl. No. 13/092,671 (dated Sep. 9, 2016).
(Continued)

*Primary Examiner* — Yee F Lam

(57) ABSTRACT

In one embodiment, packet forwarding apparatus includes a data packet receiving interface, a data packet forwarding interface, and a configuration interface. The apparatus also includes circuitry that defines a plurality of data packet forwarding paths between the data packet receiving interface and the data packet forwarding interface. The circuitry defines at least one of the plurality of data packet forwarding paths in response to input received via the configuration interface, and the circuitry adaptively reconfigures at least one of the plurality of data packet forwarding paths i) in response to input received via the configuration interface, and ii) while data packets are being received by the packet forwarding apparatus.

17 Claims, 9 Drawing Sheets

(51) Int. Cl.
*H04L 12/741* (2013.01)
*H04L 12/26* (2006.01)
*H04L 29/06* (2006.01)

(52) U.S. Cl.
CPC .............. *H04L 45/02* (2013.01); *H04L 45/74* (2013.01); *H04L 65/00* (2013.01)

(56) References Cited

U.S. PATENT DOCUMENTS

| | | | |
|---|---|---|---|
| 5,983,270 | A | 11/1999 | Abraham et al. |
| 6,130,887 | A | 10/2000 | Dutta |
| 6,434,624 | B1 | 8/2002 | Gai et al. |
| 6,505,255 | B1 | 1/2003 | Akatsu et al. |
| 6,678,250 | B1 | 1/2004 | Grabelsky et al. |
| 6,814,510 | B1 | 11/2004 | Sabbagh et al. |
| 6,907,001 | B1 | 6/2005 | Nakayama et al. |
| 7,286,652 | B1 | 10/2007 | Azriel et al. |
| 7,424,018 | B2 | 9/2008 | Gallatin et al. |
| 7,515,650 | B1 | 4/2009 | Warner et al. |
| 7,596,356 | B2 | 9/2009 | Rofougaran et al. |
| 7,769,873 | B1 * | 8/2010 | Mackie ................ H04L 45/00 709/229 |
| 7,835,348 | B2 | 11/2010 | Kasralikar |
| 7,873,702 | B2 | 1/2011 | Shen et al. |
| 7,945,216 | B2 | 5/2011 | Rakshani et al. |
| 8,098,677 | B1 | 1/2012 | Pleshek et al. |
| 8,102,783 | B1 | 1/2012 | Narayanaswamy et al. |
| 8,134,927 | B2 | 3/2012 | Gamage et al. |
| 8,248,928 | B1 | 8/2012 | Wang et al. |
| 8,259,722 | B1 * | 9/2012 | Kharitonov ........... H04L 43/028 370/392 |
| 8,306,063 | B2 | 11/2012 | Erdal et al. |
| 8,386,937 | B1 | 2/2013 | Gao et al. |
| 8,446,916 | B2 | 5/2013 | Aybay et al. |
| 9,270,542 | B2 | 2/2016 | Gamage et al. |
| 9,571,296 | B2 | 2/2017 | Nachum |
| 9,898,781 | B1 | 2/2018 | Silverman |
| 9,967,150 | B2 | 5/2018 | Nachum |
| 2002/0073136 | A1 | 6/2002 | Itoh et al. |
| 2003/0144868 | A1 | 7/2003 | MacIntyre et al. |
| 2003/0172123 | A1 | 9/2003 | Polan et al. |
| 2004/0015613 | A1 | 1/2004 | Ikeda |
| 2004/0218609 | A1 | 11/2004 | Foster et al. |
| 2005/0282502 | A1 | 12/2005 | Kursula et al. |
| 2006/0174032 | A1 * | 8/2006 | Winchester ......... H04L 12/4633 709/238 |
| 2006/0223516 | A1 | 10/2006 | Fan et al. |
| 2006/0294221 | A1 | 12/2006 | Graupner et al. |
| 2007/0177526 | A1 | 8/2007 | Siripunkaw et al. |
| 2007/0189272 | A1 | 8/2007 | Hutchinson et al. |
| 2008/0052784 | A1 | 2/2008 | Wiley et al. |
| 2008/0147831 | A1 | 6/2008 | Redjaian et al. |
| 2008/0153541 | A1 * | 6/2008 | Rakshani ................. H04B 1/40 455/552.1 |
| 2008/0170561 | A1 | 7/2008 | Halbraich et al. |
| 2008/0190639 | A1 | 8/2008 | Baran et al. |
| 2008/0215477 | A1 | 9/2008 | Annunziata |
| 2009/0182874 | A1 | 7/2009 | Morford et al. |
| 2009/0190589 | A1 | 7/2009 | Bains et al. |
| 2010/0135164 | A1 | 6/2010 | Rofougaran |
| 2010/0228854 | A1 | 9/2010 | Morrison et al. |
| 2011/0026406 | A1 | 2/2011 | Gamage et al. |
| 2011/0026521 | A1 | 2/2011 | Gamage et al. |
| 2011/0103259 | A1 | 5/2011 | Aybay et al. |
| 2011/0103595 | A1 | 5/2011 | Ramaswamy et al. |
| 2011/0264797 | A1 | 10/2011 | Matityahu et al. |
| 2012/0124257 | A1 | 5/2012 | Wu |
| 2012/0181540 | A1 | 7/2012 | Udagawa et al. |
| 2012/0317224 | A1 | 12/2012 | Caldwell et al. |
| 2013/0010605 | A1 | 1/2013 | Jocha et al. |
| 2013/0272135 | A1 | 10/2013 | Leong |
| 2013/0336240 | A1 | 12/2013 | Cherian et al. |
| 2014/0012962 | A1 | 1/2014 | Formby et al. |
| 2014/0181267 | A1 | 6/2014 | Wadkins et al. |
| 2015/0009994 | A1 | 1/2015 | Keesara et al. |
| 2015/0029846 | A1 | 1/2015 | Liou et al. |
| 2015/0055720 | A1 | 2/2015 | Lin et al. |
| 2015/0113133 | A1 | 4/2015 | Srinivas et al. |
| 2015/0113143 | A1 | 4/2015 | Stuart et al. |
| 2015/0319049 | A1 | 11/2015 | Nachum |
| 2015/0319070 | A1 | 11/2015 | Nachum |
| 2016/0057039 | A1 | 2/2016 | Htay et al. |

OTHER PUBLICATIONS

Final Office Action for U.S. Appl. No. 14/266,668 (dated Aug. 25, 2016).
Final Office Action for U.S. Appl. No. 13/933,838 (dated May 19, 2016).
Non-Final Office Action for U.S. Appl. No. 13/933,838 (dated Sep. 24, 2015).
"Selecting the Right VERAstreamTM Product," DATACOM Systems Inc, p. 1-1 (May 14, 2013).
Notice of Allowance and Fee(s) Due and Examiner-Initiated Interview Summary for U.S. Appl. No. 12/533,957 (dated Aug. 7, 2015).
Non-Final Office Action for U.S. Appl. No. 12/533,957 (dated Nov. 17, 2014).
Final Office Action for U.S. Appl. No. 12/533,957 (dated Feb. 28, 2014).
Interview Summary for U.S. Appl. No. 12/533,957 (dated Jan. 24, 2014).
Non-Final Office Action for U.S. Appl. No. 12/533,957 (dated Sep. 12, 2013).
Final Office Action for U.S. Appl. No. 12/533,957 (dated Jan. 2, 2013).
Non-Final Office Action for U.S. Appl. No. 12/533,957 (dated May 11, 2012).
Notice of Allowance and Fee(s) Due for U.S. Appl. No. 12/533,951 (dated Nov. 8, 2011).
Final Office Action for U.S. Appl. No. 12/533,957 (dated Oct. 31, 2011).
Interview Summary for U.S. Appl. No. 12/533,957 (dated Aug. 31, 2011).
Non-Final Office Action for U.S. Appl. No. 12/533,957 (dated Aug. 2, 2011).
Interview Summary for U.S. Appl. No. 12/533,951 (dated Jul. 28, 2011).
Non-Final Office Action for U.S. Appl. No. 12/533,951 (dated Feb. 18, 2011).
Agilent Technologies, "Agilent N2X: The Industry's Most Comprehensive Multiservices Test Solution for Converging Network Infrastructures," 5989-1244EN, pp. 1-6 (Feb. 1, 2006).
Agilent Technologies, "Agilent N2X PITV Quality of Experience Test Solution," N5570A and E7877A Technical Data Sheet, 5989-3440EN, pp. 1-12 (Jul. 21, 2006).
Agilent Technologies, "True Router Performance Testing: Agilent Technologies Router Tester Application Note," 5980-1421E, Rev. A, pp. 1-8 (May 2000).
Letter from Ixia to Agilent Technologies re: Notice of Indemnification Claims/Dispute pp. 1-2 (Nov. 9, 2010).
Letter from Agilent Technologies to Ixia re: Notice of Indemnification Claims/Dispute, pp. 1-2 (Oct. 28, 2010).
Letter from Ixia to Agilent Technologies re Notice of Erroneously Assigned Patent Applications and Request for Executed Assignment, pp. 1-2 (Oct. 22, 2010).
Letter from Agilent Technologies to Ixia re: Notice of Erroneously Assigned Patent Application and Request for Executed Assignment, pp. 1-2 (Oct. 8, 2010).
"Radware's Smart IDS Management, FireProof and Intrusion Detection System, Deployment and ROI," Radware, Inc. pp. 1-9 (Aug. 21, 2002).
Edwards, "Vulnerabilities of Network Intrusion Detection Systems: Realizing and Overcoming the Risks, the Case for Flow Mirroring," Top Layer Networks, pp. 1-18 (May 1, 2002).
Non-Final Office Action for U.S. Appl. No. 13/092,671 (dated Jun. 2, 2016).

(56) References Cited

OTHER PUBLICATIONS

Notice of Allowance for U.S. Appl. No. 14/266,660 (dated May 13, 2016).
Non-Final Office Action for U.S. Appl. No. 14/266,668 (dated Feb. 1, 2016).
Notice of Allowance for U.S. Appl. No. 14/266,660 (dated Jan. 21, 2016).
Extended European Search Report for European Patent Application No. 11772665.3 (dated Oct. 1, 2015).
Non-Final Office Action for U.S. Appl. No. 14/266,660 (dated Sep. 18, 2015).
Final Office Action for U.S. Appl. No. 13/092,671 (dated Nov. 6, 2014).
Non-Final Office Action of U.S. Appl. No. 13/092,671 (dated Apr. 23, 2014).
"OpenFlow Switch Specification," Open Networking Foundation, Version 1.4.0 (Wire Protocol 0x05), pp. 1-206 (Oct. 14, 2013).
Final Office Action for U.S. Appl. No. 13/092,671 (dated May 23, 2013).
Non-Final Office Action for U.S. Appl. No. 13/092,671 (dated Nov. 9, 2012).
"Smart Taps Getting Smarter," Networking, Network Computing New, http://www.networkcomputing.com/networking/smart-taps-getting-smarter/1797861399, pp. 1-2 (Mar. 22, 2012).
"Command Today's Complex Data Center Challenges," Data Center, Net Optics Data Sheet, Net Optics Inc., pp. 1-4 (2011).
Notification of Transmittal of the International Search Report and the Written Opinion of the International Searching Authority, or the Declaration for International Application No. PCT/US2011/033313 (dated Nov. 30, 2011).

Notice of Decision from Post-Prosecution Pilot Program (P3) Conference for U.S. Appl. No. 14/266,668 (dated Dec. 22, 2016).
Final Office Action for U.S. Appl. No. 13/092,671 (dated Dec. 16, 2016).
Non-Final Office Action for U.S. Appl. No. 13/933,838 (dated Dec. 1, 2016).
Notice of Allowance and Fee(s) Due for U.S. Appl. No. 14/266,660 (dated Oct. 13, 2016).
Non-Final Office Action for U.S. Appl. No. 14/266,668 (dated May 5, 2017).
Advisory Action and Examiner Initiated Interview Summary for U.S. Appl. No. 13/092,671 (dated Mar. 13, 2017).
Notice of Allowance and Examiner Initiated Interview Summary for U.S. Appl. No. 13/092,671 (dated Jul. 20, 2017).
Final Office Action for U.S. Appl. No. 13/933,838 (dated Jun. 22, 2017).
Corrected Notice of Allowability for U.S. Appl. No. 14/266,668 (dated Apr. 9, 2018).
Non-Final Office Action for U.S. Appl. No. 13/933,838 (dated May 21, 2018).
Communication pursuant to Article 94(3) EPC for European Patent Application Serial No. 11 772 665.3 (dated Apr. 4, 2019).
Non-Final Office Action for U.S. Appl. No. 13/933,838 (dated Oct. 3, 2019).
Communication under Rule 71(3) EPC Intention to Grant for European Patent Application Serial No. 11 772 665.5 (dated Sep. 20, 2019).
Advisory Action for U.S. Appl. No. 13/933,838 (dated Mar. 7, 2019).
Final Office Action for U.S. Appl. No. 13/933,838 (dated Dec. 11, 2018).

* cited by examiner

APPARATUS AND METHODS FOR FORWARDING DATA PACKETS CAPTURED FROM A NETWORK

PRIORITY CLAIM

This application is a continuation of U.S. patent application Ser. No. 12/533,957, filed Jul. 31, 2009; the disclosure of which is incorporated herein by reference in its entirety.

BACKGROUND

It is often desirable to capture the data packets that are carried over a network. Captured data packets may then be, for example: analyzed to determine their presence and correctness; sorted for purposes such as call flow analysis; factored into various statistics; or examined to determine the content or completeness of their payloads.

BRIEF DESCRIPTION OF THE DRAWINGS

Illustrative embodiments of the invention are illustrated in the drawings, in which.

DETAILED DESCRIPTION

Network monitoring is often a component of the applications that Service Providers use to manage i) their networks, and ii) the services provided over their networks. These applications capture data packets from the network and perform various types of processing. For example, signaling monitoring applications capture the signaling packets that are used to setup, control, and terminate phone calls; process those packets to recreate individual calls; and compute various measurements that can be used to determine the performance of the network.

The growth of Service Provider networks and the introduction of increasingly sophisticated services are greatly increasing the volume of traffic to be monitored. Already, the ability of application developers to keep pace with performance requirements is strained. The problem is compounded because keeping pace (linear improvement) is not sufficient, as common scaling approaches (e.g., adding more processing capability) often result in management systems that are too large to cost-effectively deploy and maintain.

Often, different applications will need access to the same monitored data. However, the applications can vary in the timeliness, volume, longevity, focus, and completeness of the data they require. For example, a troubleshooting application might need a small amount of recently retrieved, very focused data, so that it can provide an immediate answer. In contrast, a business intelligence application might need volumes of complete data so that it can provide insights into the prior month's network performance. Addressing these varying needs is often accomplished through complex routing of traffic feeds, through various data capture and filtering devices.

At least some of the apparatus and methods disclosed herein are able to adapt the flow of captured data packets to the processing capabilities of one or more applications, thereby enabling the applications to scale at a better-than-linear rate with respect to growth in network traffic.

1. Data Packet Capture

For purposes of this description, a "data packet" is defined as any sort of packetized information carried over a network. The packetized information may include, for example, multimedia, voice, data or control information.

Figure 1:
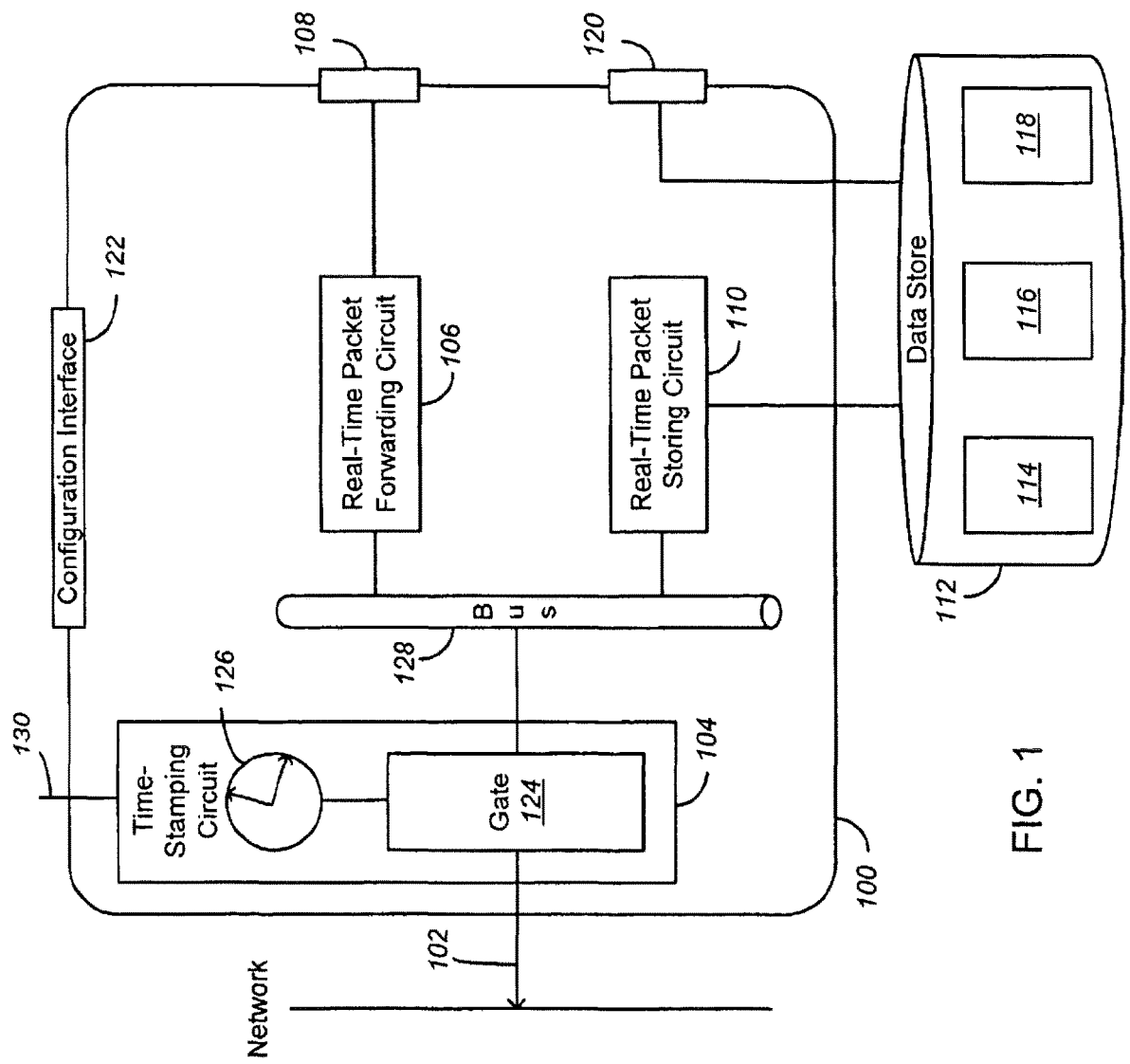
FIG. 1 illustrates an exemplary data packet capture apparatus.

FIG. 1 illustrates an exemplary data packet capture apparatus 100. As shown, the apparatus 100 comprises a physical, network-connectable data capture probe 102. The apparatus 100 also comprises a time-stamping circuit 104 that is configured to time-stamp the data packets that are captured via the data capture probe 102. In some cases, the time-stamping circuit 104 may comprise an arrival gate 124 and a clock 126. At the arrival gate 124, times may be retrieved from the clock 126 and associated with captured data packets as time-of-capture time-stamps. In some embodiment, an interface 130 may be provided for synchronizing the clock's time with a system time.

The apparatus 100 further comprises 1) a real-time packet forwarding circuit 106 that is configured to stream data packets captured via the data capture probe 102 to a real-time data packet interface 108, and 2) a real-time packet storing circuit 110 that operates in parallel with the real-time packet forwarding circuit 106. A communication bus 128, data tee or other mechanism provides captured data packets to the circuits 106 and 110 substantially in parallel. In some cases, multiple ones of the probes 102 could be connected to the communication bus 128 and provide data packets to each of the real-time packet forwarding circuit 106 and the real-time packet storing circuit 110.

The real-time packet forwarding circuit 106 is configured to forward data packets to the real-time data packet interface 108 as soon as possible, while the real-time packet storing circuit 110 is configured to store the data packets captured via the data capture probe 102 in a data store 112. Data packets are stored in the data store 112 in association with their time-of-capture time-stamps. Preferably, all captured data packets are stored in the data store 112. However, in some cases, a sampled or filtered set of data packets may be stored in the data store 112.

Depending on its configuration, the data packet capture apparatus 100 can provide various advantages over conventional data packet capture probes. For example, many applications provide their most useful or complete analyses of network traffic when they are able to review and process all of the data packets that pass over a network. However, the rate at which data propagates over a network, or the burstiness of some data, can sometimes overwhelm the processing capability of an application. In the past, applications have dealt with this issue by simply dropping certain data packets, e.g., by dropping m out of every n data packets received, or by dropping data packets whenever the application's receive buffer(s) reach capacity. The data packet capture apparatus 100 alleviates this issue by not only forwarding data packets in real-time, but by storing them for non-real-time access. In this manner, an application that knows or presumes it is dropping packets can obtain the dropped packets from the data store 112.

In some cases, an application may intentionally and routinely drop certain data packets. Such may be the case with an application that provides a high-level snapshot of network traffic. In these cases, an application can sample or filter the real-time data packet stream generated at the real-time data packet interface 108, and upon identifying an anomaly (or upon receiving a drill-down request from a user), the application may obtain a more granular data packet stream (or simply all data packets in a particular timeframe) from the data store 112.

The data packet capture apparatus 100 can also be useful in that it stores data packets in association with their time-stamps. In this manner, an application that obtains a data packet from the data store 112 can determine the temporal context of the data packet—even though the data packet was not forwarded to the application in real-time.

Depending on how the data packet capture apparatus 100 is configured, the real-time packet forwarding circuit 106 may forward data packets with or without their associated time-stamps. If the time-stamping circuit 104 is removed from the path between the data capture probe 102 and the real-time packet forwarding circuit 106, the speed at which data packets are forwarded via the real-time packet forwarding circuit 106 may be increased. However, if data packets are time-stamped upon capture, and then forwarded along with their associated time-stamps via the real-time packet forwarding circuit 106, downstream applications can construct more accurate analyses of the traffic appearing on a network.

In a simple embodiment, the real-time packet forwarding circuit 106 may consist of a wire or data transmission path. In other embodiments, the real-time packet forwarding circuit 106 may comprise other structures, such as a buffer that enables the circuit 106 to temporarily store bursts of data packets. For purposes of this description, "real-time" packet forwarding is understood to be packet forwarding that is accomplished as soon as possible, possibly with temporary buffering of data packets for seconds or fractions of a second, but without moving data packets to a longer term data store (e.g., for minutes or hours).

The real-time packet storing circuit 110 may store data packets in the data store 112 in various ways. In some embodiments, the real-time packet storing circuit 110 may simply store each data packet in association with its time-stamp. In other embodiments, the real-time packet storing circuit 110 may associate stored data packets in different groups (i.e., "buckets"). In some cases, the different groups may correspond to different time periods in which data packets are received. For example, time may be broken into consecutive N-second periods, and the data packets received in different N-second periods may be associated in different groups. In other cases, the different groups may correspond to volumes of captured data packets. For example, a new packet group may be formed following the receipt of every M packets.

For ease or speed of access, the different groups of data packets stored in the data store 112 may be stored in different physical or logical structures 114, 116, 118, such as different physical or logical partitions, tables or files. For example, first and second consecutively captured groups of data packets may be stored in respective first and second partitions, such as disk partitions, of the data store 112. Or, for example, first and second consecutively captured groups of data packets may be stored in respective first and second tables or files in the data store 112.

By way of example, the data store 112 may comprise one or more disks or servers, or a storage area network (SAN). However, there is no inherent limitation on the type or size of data store used (beyond any existing size limitation of the type of data storage technology used). Also, the storage of data packets in groups (or "buckets") is not intended as a replacement for disk configurations such as RAID (redundant array of inexpensive disks) configurations. Rather, the storage of data packets in groups is intended to be compatible with data reliability solutions that might be employed (such as RAID).

In some embodiments, the data packet capture apparatus 100 may further comprise a non-real-time packet interface 120. Alternately, the data store 112 or another element (not shown) may provide an interface to the data store 112. In some cases, the real-time packet storing circuit 110 may set or provide an indicator when all of the data packets of a group have been written to the data store 112. A non-real-time packet interface, such as the interface 120, may then provide read access to a particular group of data packets after all of the data packets in the particular group have been stored in the data store 112. In this manner, faster access may be provided to different groups of data, while also maintaining the integrity of the data store 112 and any non-real-time stream(s) or data derived therefrom.

In some cases, the non-real-time packet interface 120 may provide a stream of data packets at a rate that differs from the rate of data packets forwarded via the real-time data packet interface 108. In other cases, the non-real-time packet interface 120 may provide data packets, or particular groups of data packets, in response to application queries.

The data packet capture apparatus 100 may also comprise a configuration interface 122. The configuration interface 122 enables an application or user to configure or control one or more parameters of the data packet capture apparatus 100. For example, in some embodiments, input (e.g., configuration information) may be received via the configuration interface 122; and in response to this input, the real-time packet storing circuit 110 may configure, or adaptively reconfigure, at least one parameter of the different groups of data packets stored in the data store 112. In some cases, the at least one parameter may comprise a time period covered by each group (e.g., N seconds). In other cases, the at least one parameter may comprise a data packet volume (e.g., M data packets). In still other cases, the at least one parameter may comprise the number of the data packet groups, the format of the data packet groups, or a time indicating how long the data in each group should be maintained before being overwritten. Other parameters may also be configured or adaptively reconfigured.

In some embodiments, the configuration interface 122 may be used to configure the data packet capture apparatus 100 upon power-up or between data packet capture. In the same or different embodiments, the configuration interface 122 can be used to configure the data packet capture apparatus 100 while data packets are being captured by the data packet capture apparatus 100. For example, configuration information could be received via the configuration interface 122 during data packet capture, and in response to this information, the real-time packet storing circuit 110 could adaptively reconfigure a parameter of the data packet groups stored in the data store 112.

The data packet capture apparatus 100 may be implemented using various technologies, including printed circuit board, integrated circuit, and/or other technologies. In some embodiments, some or all of the circuits of the data packet capture apparatus 100 may be implemented, at least in part, using a field-programmable gate array (FPGA) or microprocessor.

Figure 2:
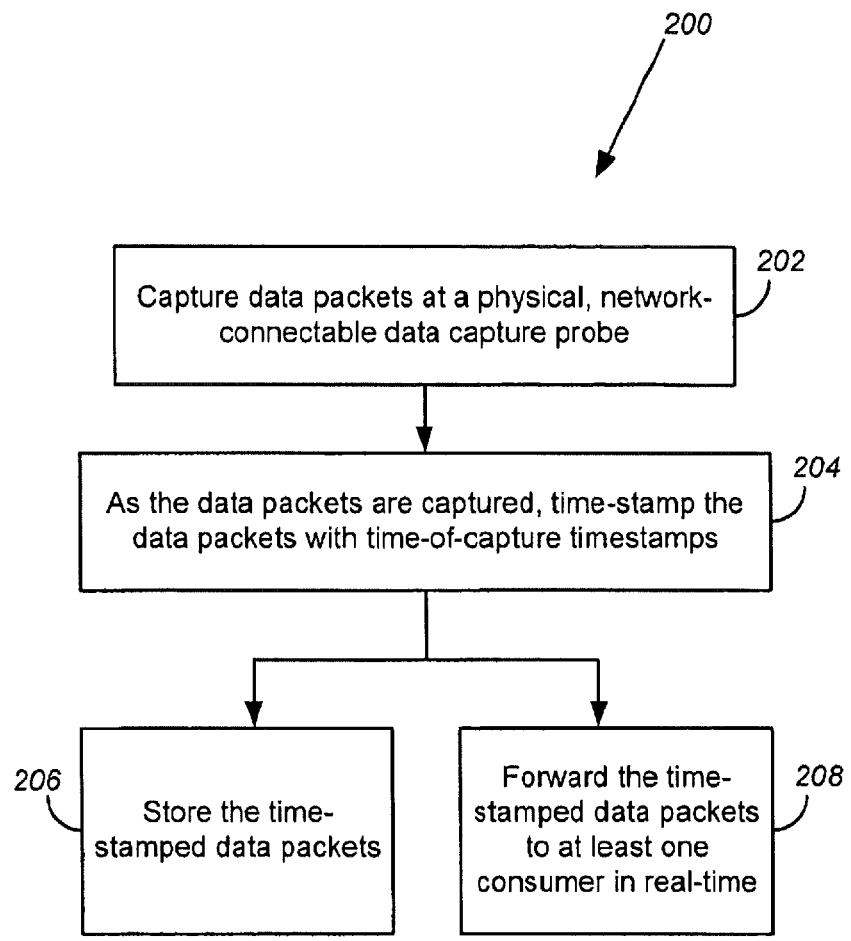
FIG. 2 illustrates an exemplary method for capturing data packets from a network.

FIG. 2 illustrates an exemplary method 200 for capturing data packets from a network. In some cases, the method 200 may be implemented using the data packet capture apparatus 100 (FIG. 1). The method 200 comprises capturing the data packets at a physical, network-connectable data capture probe (at block 202). As the data packets are captured, the data packets are time-stamped with time-of-capture time-stamps (at block 204). In parallel, the time-stamped data packets are a) stored (at block 206), and b) forwarded to at least one consumer in real-time (at block 208).

In some embodiments, storing the time-stamped data packets may comprise storing the time-stamped data packets in different groups, such as groups corresponding to different time periods or groups defined in response to volumes of data packets captured. When data packets are stored in different groups, consumer access to a particular group of stored data packets may be provided only after all of the data packets in the particular group have been stored (e.g., on a group-by-group basis). This eliminates read/write conflicts, yet provides access to certain data packets while other data packets are being received.

In some cases, stored data packets may be automatically streamed from a data store, but at a different rate than data packets forwarded in real-time. In other cases, stored data packets may be retrieved: on a query basis, based on their associated time-stamps, or based on the time-stamp ranges of the groups in which the data packets are stored. In any case, a process (e.g., a consumer or application) that retrieves the data packets from the data store may provide indications that the data packets of particular groups have been read and can be overwritten. Alternately, and by way of example, groups of data packets can be flagged for overwrite after a predetermined period of time.

The above-described apparatus and methods are useful in many contexts in which data packets passing over a network need to be monitored or analyzed. However, the apparatus and methods are particularly useful when data packets need to be monitored in high-speed or bursty networks, such as networks that carry voice traffic and other streaming media.

The consumers or applications that receive or retrieve data packets from the data packet capture apparatus 100 (or via the method 200) may take various forms, including those of: network or service monitoring or analysis tools; or real-time or non-real-time applications. Consumers or applications may be hardware or software-based, or may comprise a combination thereof. In some cases, consumers and applications may comprise structures, processes or components that sample, filter, decode or condition the data packets that are forwarded to (or retrieved by) other consumers or applications. To a large extent, the terms "consumer" and "application" are interchangeable.

The apparatus and methods disclosed herein my be considered "smart" in that they can provide a consumer or application with all of the data packets appearing on a network, and can often do so at a rate or time that is adaptable to the needs of particular consumers or applications (including multiple consumers or applications). In some cases, and as previously described, the apparatus and methods disclosed herein can implement a configuration interface or function. In this manner, the packet rate of a non-real-time stream can be adapted to the need (or changing need) of a particular consumer or application.

Another advantage of the apparatus and methods disclosed herein is that they scale well. That is, as the speed or volume of traffic on a network increases, a consumer or application may adaptively choose whether it receives a real-time or non-real-time stream of data packets; or, a consumer or application may query the data store 112 for data packets that it dropped. Also, if a consumer or application intentionally drops data packets, it or its user can later retrieve a more granular data packet view (or all data packets in a particular time period) for purposes such as: a drill-down analysis, a determination of the cause of an anomaly or trend, or a call trace.

Although additional structures and functionality can be integrated into the data packet capture apparatus 100 (FIG. 1), it is noted that its basic time-stamp, store and forward circuits can typically be implemented at relatively little cost.

2. Data Packet Forwarding

Figure 3:
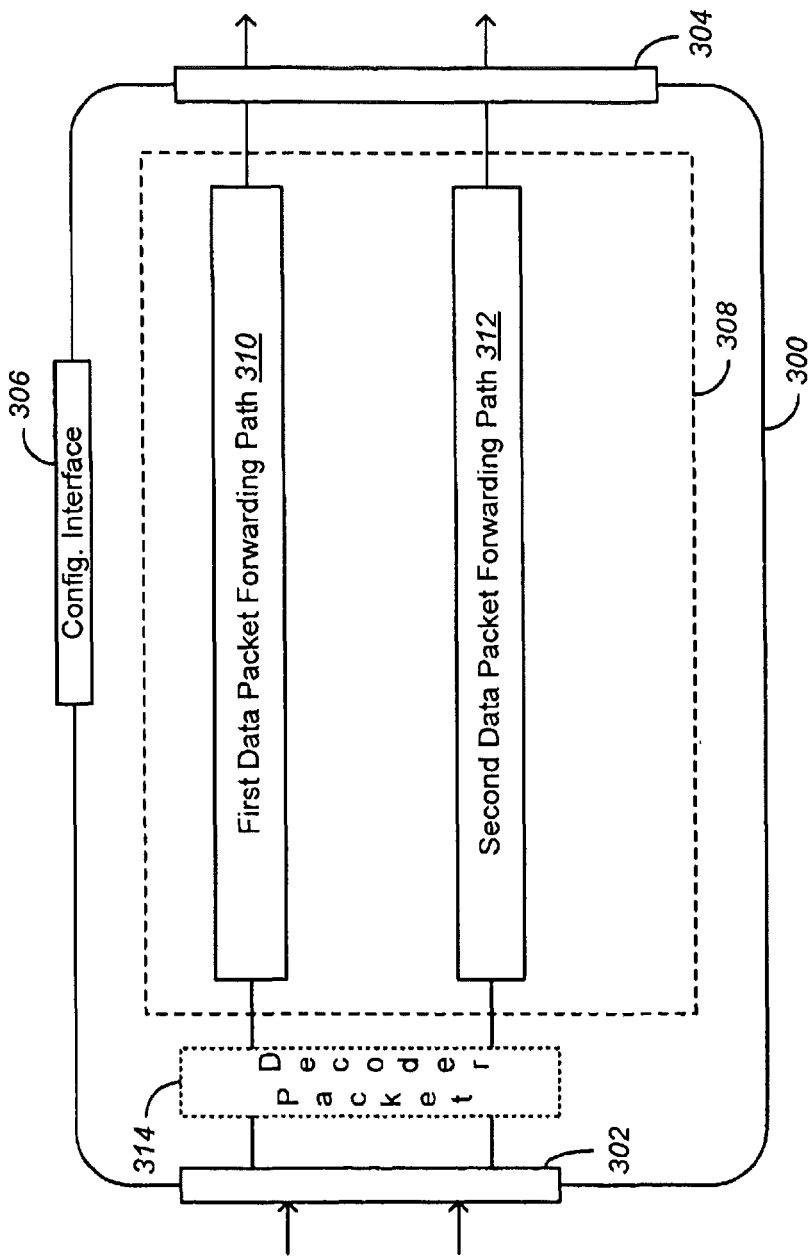
FIG. 3 illustrates an exemplary packet forwarding apparatus that may be coupled to, or included in, a data packet capture apparatus such as the apparatus shown in FIG. 1.

In some embodiments, the data packets provided by the real-time and non-real-time interfaces 108, 120 include "all" captured data packets (as is the case at the real-time interface 108) or "all of the data packets in a particular group of data packets" (as is the case at the non-real-time interface 120). However, it can sometimes be desirable to further tailor a packet stream for a consumer or application. For example, it can sometimes be desirable to sample, filter, decode or condition the data packets that are forwarded to (or retrieved by) a consumer or application. To this end, FIG. 3 illustrates an exemplary packet forwarding apparatus 300 that may be coupled to, or included in, a data packet capture apparatus such as the apparatus 100.

The exemplary packet forwarding apparatus 300 comprises a data packet receiving interface 302, a data packet forwarding interface 304, and a configuration interface 306. The data packet receiving interface 302 may comprise a plurality of inputs, and the data packet forwarding interface 304 may comprise a plurality of outputs. The apparatus 300 also comprises circuitry 308 that defines a plurality of data packet forwarding paths (i.e., two or more paths 310, 312) between the data packet receiving interface 302 and the data packet forwarding interface 304. The circuitry 308 defines at least one of the plurality of data packet forwarding paths (and may define all of the data packet forwarding paths) in response to input (e.g., configuration information) received via the configuration interface 306. In some embodiments, some or all of the circuitry of the packet forwarding apparatus 300 may be implemented, at least in part, using a field-programmable gate array (FPGA) or microprocessor.

Figure 4:
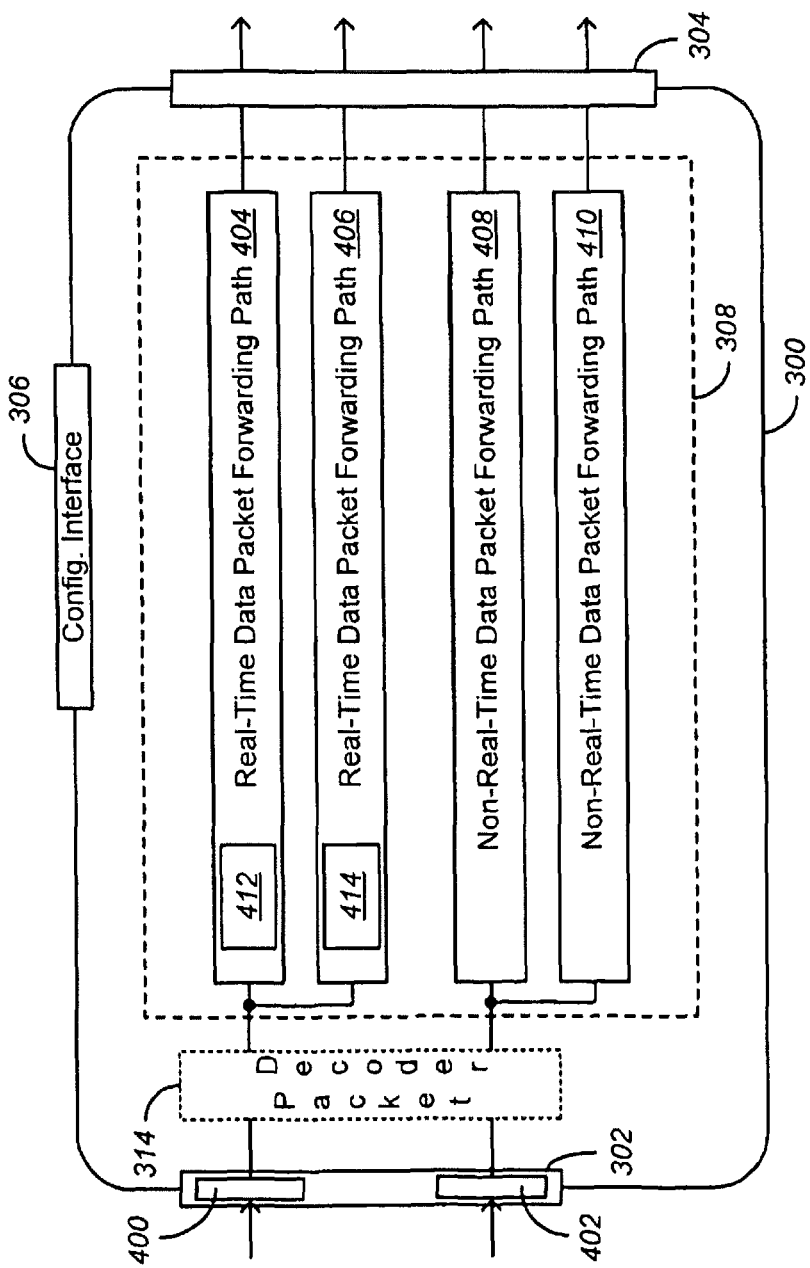
FIG. 4 illustrates exemplary real-time and non-real-time data packet interfaces of the data packet receiving interface shown in FIG. 3.

Also in some embodiments, and as shown in FIG. 4, the data packet receiving interface 302 may comprise a real-time data packet receiving interface 400 and a non-real-time data packet receiving interface 402. In these embodiments, the circuitry 308 may define one or more real-time data packet forwarding paths, such as paths 404 and 406, and one or more non-real-time data packet forwarding paths, such as paths 408 and 410. The real-time data packet forwarding paths 404, 406 must necessarily be coupled to the real-time data packet receiving interface 400. However, the non-real-time data packet forwarding paths 408, 410 may be coupled to either the non-real-time data packet receiving interface 402 or the real-time data packet receiving interface 400.

The real-time data packet forwarding path or paths 404, 406 may comprise any one or more of: a path via which all received data packets are forwarded; a real-time sampled data packet forwarding path; a real-time filtered data packet forwarding path; or another type of real-time forwarding path. The non-real-time data packet forwarding path or paths 408, 410 may comprise any one or more of: a path via which all received data packets are forwarded; a path via which selected data packets are forwarded, in response to application queries; a non-real-time sampled data packet forwarding path; a non-real-time filtered data packet forwarding path; or another type of non-real-time forwarding path.

For purposes of this description, a "real-time sampled data packet forwarding path" comprises circuitry, such as a data sampling circuit 412 (FIG. 4), that samples received data packets and forwards only a subset of the received data packets. In some embodiments, the set of forwarded data packets may comprise every n-th data packet received, or n packets per a given time period. In other embodiments, more complex sampling algorithms, including pseudo-random sampling, may be employed. In some cases, the sampled data may be selected so that it is statistically significant. For example, the fixed or average sampling frequency may be configured such that the sample rate is correlated to the time periods for which data packets are stored in the data store 112 (FIG. 1). A real-time sampled data packet forwarding path can be useful when data packets are captured by a data capture probe 102 at a rate that exceeds the processing capacity of a downstream application.

A "real-time filtered data packet forwarding path" comprises circuitry, such as a data packet filter 414, that filters received data packets and forwards only a subset of the received data packets. A data packet filter specifies one or more properties of the content of a data packet. As a result, a data packet filter will typically require a partial or full packet decode. Some exemplary data packet filters include: 1) a filter that only forwards packets associated with a particular phone number, 2) a filter that only forwards packets associated with a particular internet protocol (IP) address, or 3) a filter that only forwards real-time protocol (RTP) packets. Combinations of these and other filters may also be employed.

Because a filtered data packet forwarding path typically needs to parse decoded packet information, the packet forwarding apparatus 300 (FIGS. 3 & 4) is shown to include an optional packet decoder 314. The packet decoder 314 may locate various (or all) of the data fields contained in received data packets. Although the packet decoder 314 is coupled to the data packet receiving interface 302, the packet decoder 314 (or another packet decoder) could be positioned elsewhere in the packet flow. For example, in some cases, a packet decoder could be included in the circuitry that defines a particular data packet forwarding path 310, 312. After a data packet has been partially or fully decoded, the data packet may be forwarded in decoded form, partially decoded form, raw form (un-decoded), or some combination thereof.

Non-real-time sampled or filtered data packet forwarding paths may operate similarly to real-time sampled or filtered data packet forwarding paths. However, non-real-time forwarding paths may operate on a non-real-time data packet stream, or on a group of data packets spanning a particular time period.

Figure 5:
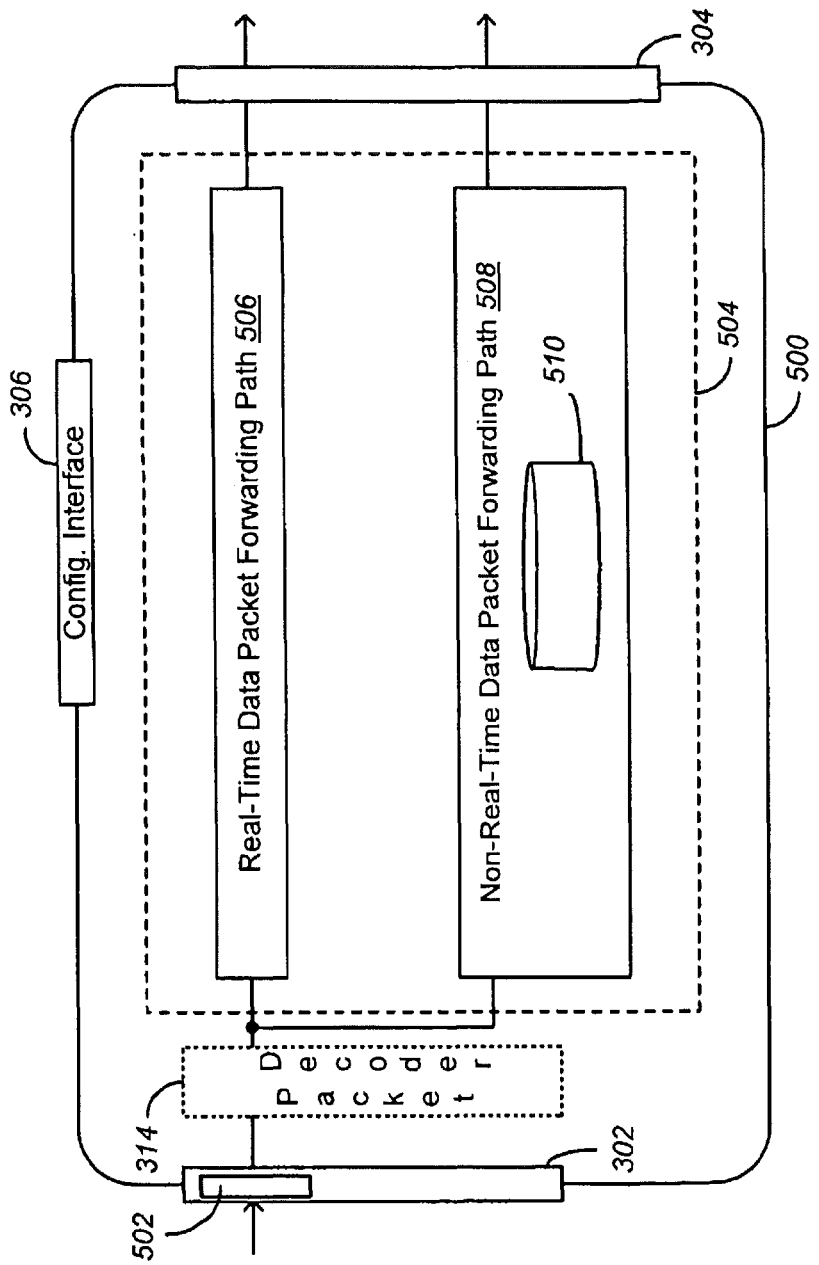
FIG. 5 illustrates i) a single real-time data packet receiving interface that may be coupled to the real-time data packet forwarding interface shown in FIG. 1, and ii) an additional data store that may be implemented or accessed by a packet forwarding apparatus.

In some embodiments, the data packet receiving interface 302 of the packet forwarding apparatus 300 may be coupled to a physical, network-connectable, data capture probe, such as the data capture probe 102 (FIG. 1). In these embodiments, the packet forwarding apparatus 300 may be coupled to the data packet capture apparatus 100 in a variety of ways. For example, in some cases, the packet forwarding apparatus 300 may be implemented separately from the data packet capture apparatus 100. In these cases, the real-time and non-real-time data packet receiving interfaces 400, 402 shown in FIG. 4 may be respectively coupled to the real-time and non-real-time data packet interfaces 108, 120 shown in FIG. 1. The data store 112 (FIG. 1) may therefore provide some or all of the storage or caching requirements of a non-real-time data packet forward path 408 or 410. Alternately, a real-time data packet receiving interface 502 of a packet forwarding apparatus 500 (FIG. 5) may be coupled to the real-time data packet interface 108 (FIG. 1), and circuitry 504 may provide real-time and non-real-time data packet forwarding paths 506, 508 between the interface 502 and the interface 304. In this embodiment, an additional data store 510 may be implemented or accessed by the packet forwarding apparatus 500. As shown in FIG. 5, the non-real-time data packet forwarding path 508 may first route data packets received at the interface 502 to the data store 510, and then retrieve some or all of the data packets stored in the data store 510 for forwarding via the interface 304.

Figure 6:
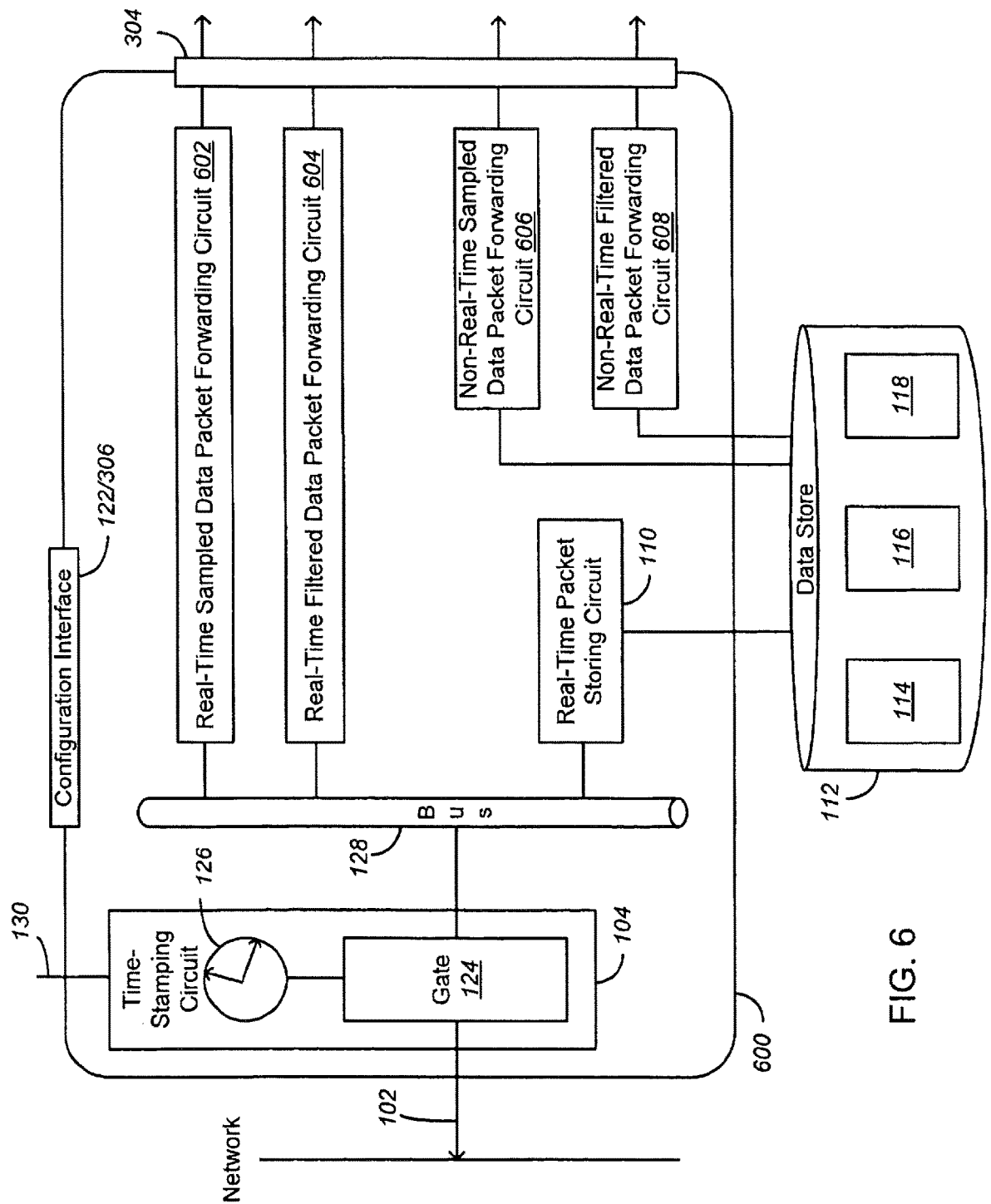
FIG. 6 illustrates exemplary real-time and non-real-time data packet forwarding paths, as well as sampled and filtered data packet forwarding paths, of a data packet capture apparatus.

In other embodiments, part or all of the packet forwarding apparatus 300 may be integrated into the data packet capture apparatus 100. For example, and as shown in FIG. 6, real-time and/or non-real-time sampled or filtered data packet forwarding paths 602, 604, 606, 608 may be provided by a data packet capture apparatus 600.

Figure 7:
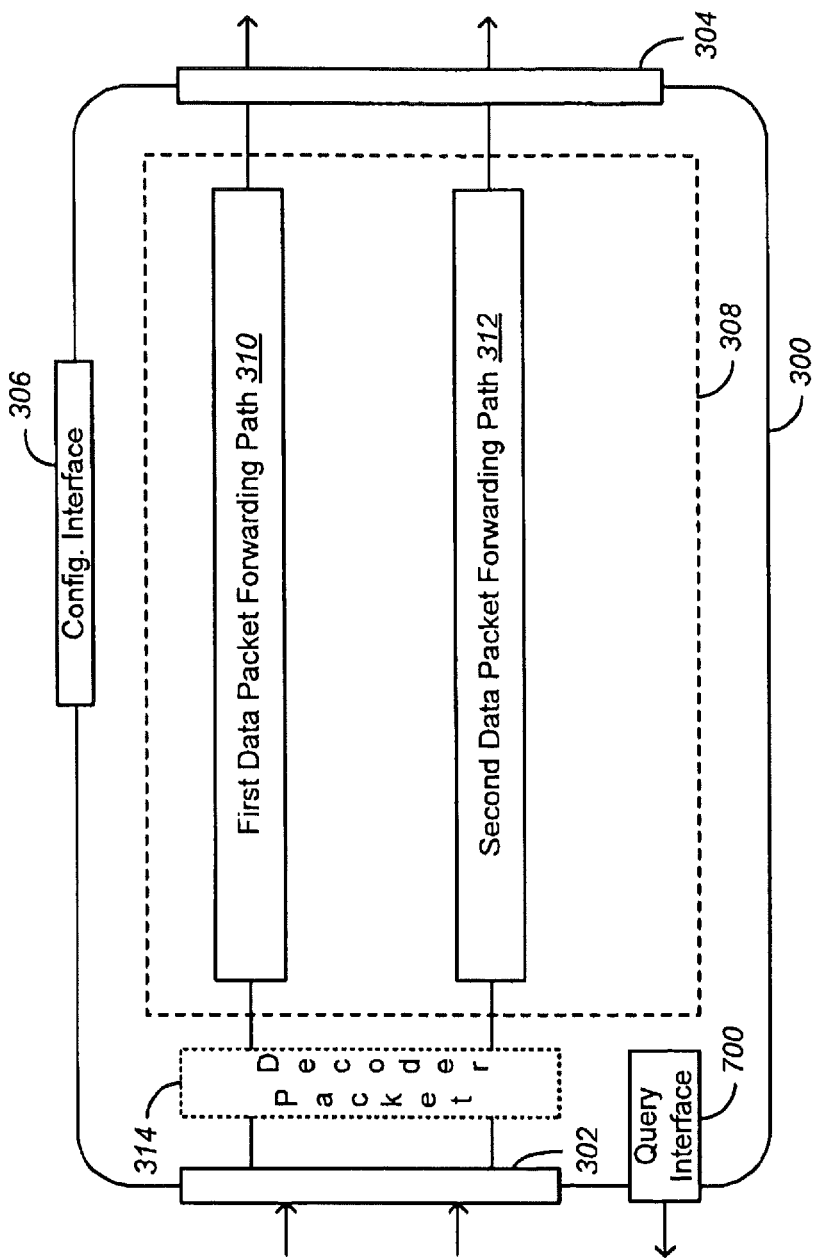
FIG. 7 illustrates an exemplary packet forwarding apparatus comprising a query interface.

In any of the above embodiments, non-real-time data packet forwarding paths such as the paths 408, 410 may forward data that is automatically received at (i.e., pushed to) a non-real-time data packet receiving interface (e.g., the interface 402 (FIG. 4)). Alternately, the circuitry 308 of the packet forwarding apparatus 300 may comprise a query interface 700 (FIG. 7), and one or more of the non-real-time data packet forwarding paths 404, 406 may forward data that is received at a non-real-time interface (e.g., the interface 402) in response to queries issued by the query interface 700. The query interface 700 may be operated, directly or indirectly, in response to application requests for particular time periods or groups of data packets. Alternately, the query interface 700 may be operated in response to the processing capability of the packet forwarding apparatus 300 (e.g., the packet forwarding apparatus 300 may request a next group of data packets when it is ready to process it). In yet other embodiments, the query interface 700 may be implemented externally from the packet forwarding apparatus 300.

In addition to non-real-time data packet forwarding paths relying on a data store 112 (FIG. 1) or 504 (FIG. 5), any data packet forwarding path, whether real-time or non-real-time, may incorporate structures such as buffers. Buffering enables forwarding paths to i) temporarily store bursts of data packets in a real-time data packet stream, or ii) adapt to differences in processing rates between forwarding paths and downstream consumers or applications.

Exemplary implementations and uses of the configuration interface 306 (as shown in FIGS. 3-7) will now be discussed.

Input received via the configuration interface 306 may be used in a variety of ways and for a variety of purposes. For example, input received via the configuration interface 306 may be used to configure, or adaptively reconfigure, one or more data packet forwarding paths 310, 312. For purposes of this description, "adaptively reconfiguring" means reconfiguring a piece of apparatus while the apparatus 300 is being used. Thus, for example, the data packet forwarding apparatus 300 may be adaptively reconfigured while data packets are being received by, or output from, the apparatus 300.

Consider, for example, a data packet forwarding path 404 that comprises a data packet sampling circuit 412 or a data packet filter 414 (FIG. 4). In such cases, input received via the configuration interface 306 may be used to adaptively reconfigure at least one parameter of the data packet sampling circuit 412 or data packet filter 414. In this manner, an application could adapt a stream of data packets generated at the data packet forwarding interface 304—in response, for example, to changes in the processing capability of the application; to filling of an application's data store(s); or to anomalies or changes noted in the stream of data packets generated at the data packet forwarding interface 304. A stream of data packets may also be adapted to application user preferences, or in response to a drill-down request.

In addition to (or instead of) using input received via the configuration interface 306 to configure or reconfigure a data packet forwarding path, input received via the configuration interface 306 may indicate the data packet forwarding path(s) to which a consumer or application would like to register or subscribe. Or, input received via a configuration interface may be used to instantiate or decommission one or more data packet forwarding paths. For example, if a new or existing application desires to receive a new or different type of data packet stream, the application can request the instantiation of a new data packet forwarding path. Instantiation of a new data packet forwarding path can be supported, for example, by an FPGA or other type of programmable circuit. Of note, it is envisioned that multiple applications can subscribe to, or receive data packets from, a single data packet forwarding path. It is also envisioned that a single application can register to receive data packets from multiple data packet forwarding paths.

Input received via the configuration interface 306 may also be used to configure whether a data packet forwarding path forwards raw data packets or decoded data packets (or some combination thereof). For purposes of this description the phrase "decoded data packets" reads on both fully decoded packets and partially decoded data packets.

Figure 8:
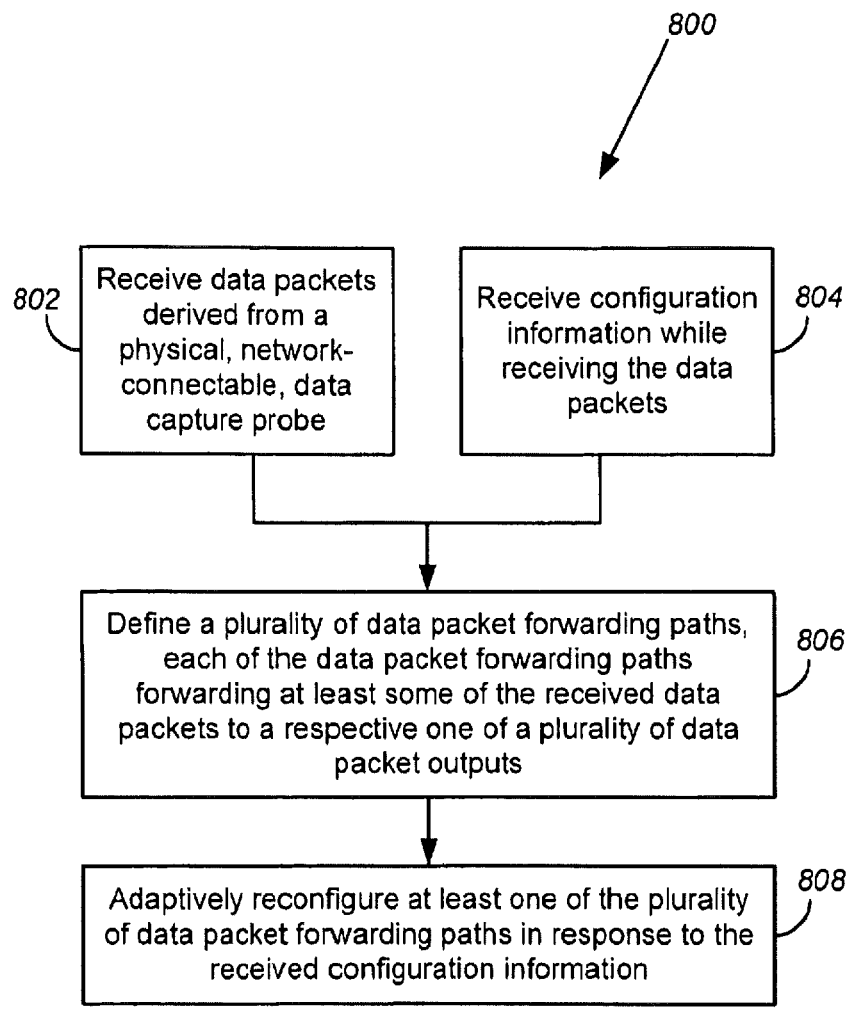
FIG. 8 illustrates an exemplary packet forwarding method.

FIG. 8 illustrates an exemplary packet forwarding method 800. In some cases, the method 800 may be implemented using the packet forwarding apparatus shown in any of FIGS. 3-7. The method 800 comprises receiving data packets derived from a physical, network-connectable, data capture probe (at block 802). While receiving the data packets, configuration information is also received (at block 804). With the configuration information and received data packets, a plurality of data packet forwarding paths is defined at block 806. Each of the data packet forwarding paths is defined such that it forwards at least some of the received data packets to a respective one of a plurality of data packet outputs. Further, at least two of the data packet forwarding paths are defined to forward data packets at different rates. At block 808, at least one of the plurality of data packet forwarding paths is adaptively reconfigured in response to the received configuration information.

The data packet forwarding paths defined by the method 800 may comprise real-time and/or non-real-time data packet forwarding paths. The data packet forwarding paths may also comprise sampled, filtered or other types of data packet forwarding paths. The adaptive reconfiguration of a data packet forwarding path may comprise any of the types of adaptive reconfiguration previously mentioned, including, for example, adaptive reconfiguration of one or more parameters of a data packet sampling circuit or data packet filter.

The apparatus and methods disclosed herein are useful in several respects. For example, the apparatus and methods can be used to adapt an arbitrary or high speed flow of data packets captured from a network to the flow rate(s), data requirement(s) or purpose(s) of one or more downstream consumers or applications.

Via real-time, non-real-time, sampled, filtered or other types of data packet forwarding paths, data packet streams may be generated to meet application requirements such as the following: (1) timeliness, which refers to how quickly an application expects data packets to arrive relative to their capture; (2) volume, which refers to the amount of data that must be processed, typically a function of the packet arrival rate; (3) longevity, which refers to how long data packets need to be retained; (4) focus, which refers to the type or breadth of data that is considered meaningful to an application's tasks (such as monitoring or analysis); and (5) completeness, which refers to the quantity or statistical significance of data packets required by an application. For an example of varying degrees of "focus", consider 1) the troubleshooting of an individual phone call, which troubleshooting may require very focused data (e.g., data pertaining to a particular call) versus 2) the presentation of a "dashboard" summary of network performance, which summary may require much less focused data.

The apparatus and methods disclosed herein typically scale better than conventional apparatus and methods for capturing and forwarding data packets. That is, so long as a data capture probe and time-stamping circuit are able to initially capture and time-stamp the data packets passing over a network, a combination of real-time, non-real-time, sampled, filtered and/or other types of data packet forwarding paths—receiving data derived from one or more data capture probes—provides various alternate mechanisms for adapting the content and rate of different data packet streams to the needs of downstream consumers or applications. If the flow of data packets over a network increases, or is bursty, consumers or applications that lack the processing capability to adapt can subscribe to or instantiate data packet forwarding paths that 1) forward data packets at different rates, or 2) forward only selected data packets. Also, when conditions dictate, a consumer or application can rely more heavily on a non-real-time data packet forwarding path. Thus, the apparatus and methods disclosed herein can reduce or eliminate the need to acquire new or better data capture and forwarding hardware, which can, in turn, lead to financial savings over the currently available data capture and forwarding technologies.

By providing multiple data packet forwarding paths based on a common collection of captured data packets, the methods and apparatus disclosed herein can also improve system reliability (that is, in contrast to distributed systems that rely on multiple discrete data capture probes or packet forwarders). Combining various of the packet forwarding strategies disclosed herein also reduces the deployment cost and configuration complexity that would otherwise exist when large numbers of discrete devices are required to support the scale of the network and traffic shaping requirements of the applications in use.

3. Data Packet Monitoring and Analysis

Figure 9:
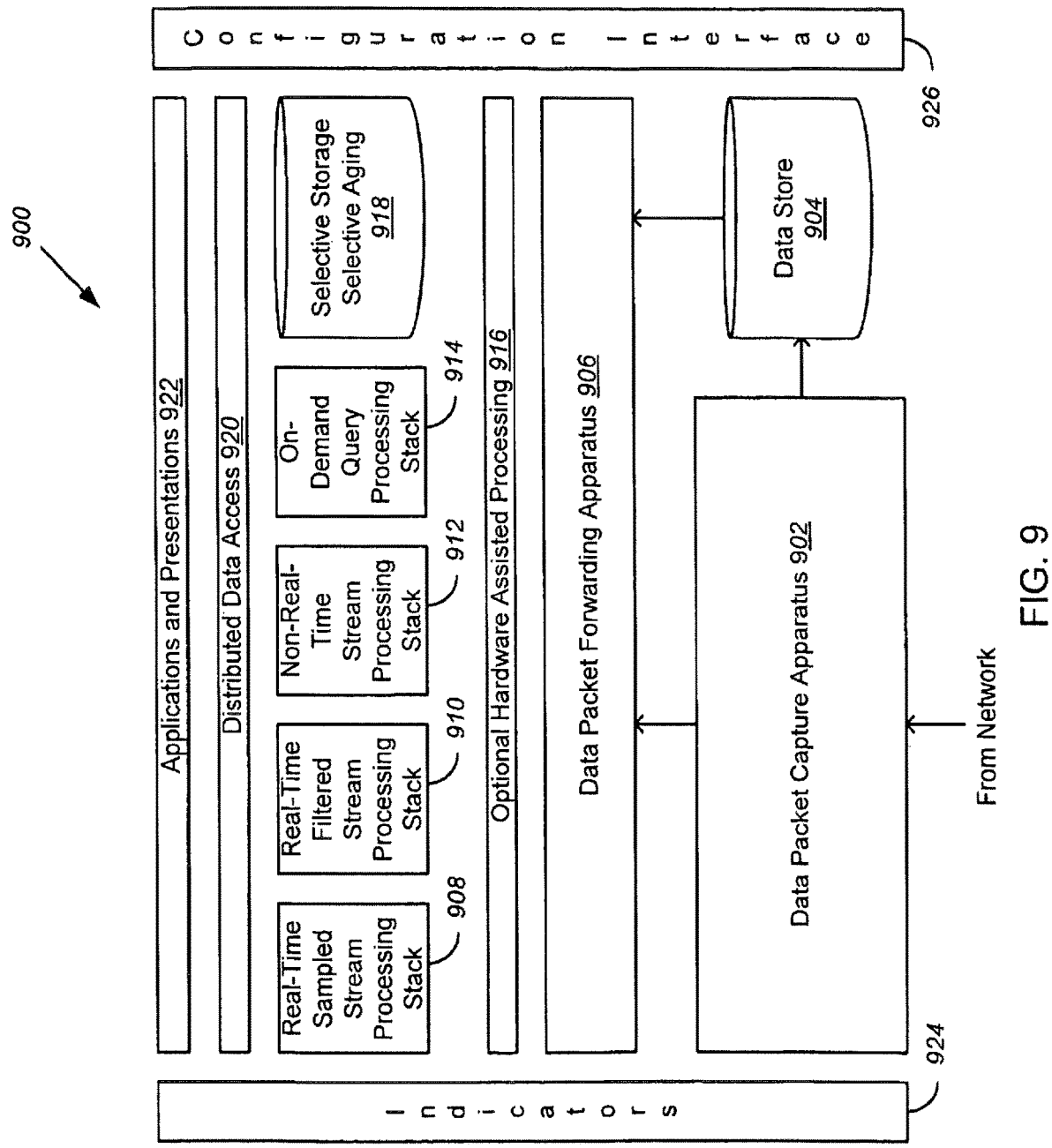
FIG. 9 illustrates an exemplary system that supports the needs of various real-time, non-real-time and query-based applications, such as traffic monitoring and analysis applications.

As shown in FIG. 9, the above-described apparatus and methods for capturing and forwarding data packets may be utilized by an exemplary system 900 that supports the needs of various real-time, non-real-time and query-based applications, such as traffic monitoring and analysis applications.

The system 900 is scalable in that it is designed to process data packets consumed by real-time, non-real time and query-based (on-demand) applications. The system also allows applications to register for multiple data packet feeds, and allows applications to change or configure their data packet feeds.

The system 900 is "adaptive" in the sense that buffering, processing and storage of captured data packets can be dynamically controlled (through buffering, sampling, filtering, and aging), and dynamic control can be employed according to the needs of real-time and non-real time-applications as well as fluctuations between low and high rates of data packet capture.

The exemplary system 900 (FIG. 9) comprises a data packet capture apparatus 902 and data store 904, as described in Section 1 of this Detailed Description. The system 900 also comprises a packet forwarding apparatus 906, as described in Section 2 of this Detailed Description. As described in Sections 1 and 2, the capture apparatus 902, forwarding apparatus 906 and data store 904 may be more, or less, integrated with one another.

In communication with the packet forwarding apparatus 906 is a number of processing elements which, by way of example, may comprise various data packet processing stacks 908, 910, 912, 914, an optional hardware assisted processing layer (or layers) 916, and a data store 918 for selective storage and aging of processed data. By way of example, the processing stacks are shown to comprise a real-time sampled stream processing stack 908, a real-time filtered stream processing stack 910, a non-real-time stream processing stack 912 and an on-demand query processing stack 914. However, in different configurations of the system 900, more or fewer processing stacks could be provided.

The exemplary system 900 may further comprise a distributed data access layer 920 for providing access to processed data, and an application and presentation layer 922. Also provided are one or more indicators 924 that indicate to applications how data packets have been processed, as well as one or more configuration interfaces 926 that enable applications or users to configure (or adaptively reconfigure) various elements of the system 900.

Exemplary implementations of system elements other than the data packet capture apparatus 902, the data store 904, and the packet forwarding apparatus 906 will now be described.

The optional hardware assisted processing layer 916 may comprise specialized hardware modules that perform high-speed hardware-assisted processing, such as modules that parse complex protocols, split aggregated streams into their individual streams, or perform measurements that are well-suited for hardware implementation, such as making "peg counts." The hardware modules in this layer may be less complex than typical hardware probes because they need not be concerned with the variety of network interfaces that a typical hardware probe must handle. Those responsibilities can be consolidated in the data packet capture apparatus 902. The hardware modules in the layer 916 may be agnostic to the streaming characteristics of the various data packet streams that it receives or forwards. This makes it very simple to add additional modules, without impacting other parts of the system 900.

The data packet processing stacks 908, 910, 912, 914 process data to meet the requirements of various downstream applications (such as monitoring and analysis applications). The stacks 908, 910, 912, 914 may be more or fewer in number and may comprise any number of subcomponents that perform a variety of processing and storage functions. For example, a real-time call flow generation stack might re-create the "signature" of a call by correlating packets from multiple protocols in real-time as the packets pass through the processing stack. A non-real-time stack might take a continuous feed of raw data packets and do business intelligence processing on the data in 24-hour intervals.

Exemplary implementations of the processing stacks 908, 910, 912, 914 shown in FIG. 9 are described below.

The real-time sampled processing stack 908 may utilize the grouping (or "bucketing") capability of the data packet capture apparatus 902 to provide a statistically valid real-time sampled flow of data packets. That is, the stack 908 may generate a statistically significant sample of data packets taken from the first portion of each packet group stored in the data store 904. The processing performed by the stack 908 can be made cognizant of the fact that data packets are sampled (e.g., via the indicators 924) and may thus provide results suitable for sampled data.

The real-time filtered stream processing stack 910 may utilize application or user-defined filters to limit the set of data packets processed to those data packets matching the filter. The stack 910 may process the data packets passed by the filter in real-time. For example, a filter might be created for a subscriber's phone number, such that all calls associated with the subscriber's phone number will be processed.

The non-real-time stream processing stack 912 may operate on a stream of data packets that are provided at a rate (or rates) lower than a real-time rate. As long as the average processing rate over the interval during which the processing is being done exceeds the average traffic rate over that same interval (and sufficient data storage space is provided by the data store 904 for intermittent traffic bursts), no data will be lost. While the uses of this processing stack will often operate on all of the data stored in the data store 904, processing of sampled and filtered data sets is also possible.

The on-demand (query) processing stack 914 may operate on data that is requested from the data store 904 using one or more query mechanisms. The potential uses of this processing stack are broad, ranging from post-capture analysis of all data, to "deep dives" or drill-downs on very focused sets of data.

Of note, the processing stacks 908, 910, 912, 914 are de-coupled from the data capture and packet forwarding aspects of the system 900 (or at least can be). Thus, different components of the system can store, forward or process data at different rates. Yet, because of the time-stamping of captured data packets, all parts of the system 900 can produce statistically significant results.

There are no inherent restrictions on the data output interfaces of the various processing stacks 908, 910, 912, 914. For example, a "live feed" using any suitable communications protocol could be supported. Alternatively, "batch feeds", such as a periodic write to a file in a known location, could be used.

Data reduction will often be one of the processing functions that occurs within the processing stacks 908, 910, 912, 914. As a result, the processing stacks may be provided with their own storage 918 wherein the reduced data are stored. The data storage and retention needs of the reduced data can be considerably different from application to application. In some cases, the processing stacks 908, 910, 912, 914 can be configured to perform selective storage of processed data, whereby only the data that is required by downstream applications is retained—not necessarily all the data all the time. Correspondingly, the processing stacks 908, 910, 912, 914 may perform selective aging of processed data, whereby various aging algorithms are employed for different types of data, different parts of the network, and various application uses of the data.

In some cases, a particular processing stack might have ultimate responsibility for some set of data in the data store 904, such that when that stack has completed all of its processing on the data, that data can be flagged for deletion. The configuration interfaces 926 may provide a feedback mechanism from the processing stacks 908, 910, 912, 914 to the data store 904, allowing the processing stacks to indicate that the content of a given data packet group (or groups) has been processed and the structures in which the data packet group are stored are available for reuse.

In some cases, the processing stacks 908, 910, 912, 914 and related data stores 904, 918 can be spread across geographically distributed sites and across multiple servers within the same site. A distributed data access layer 920 may therefore provide consolidated access to processed data from the stacks 908, 910, 912, 914 or data store 918, and may provide indirect access to the data in data store 904.

The applications 922 may use the distributed data access layer 920 to obtain data that is presented to application users (which user may in some cases be another application). There are no inherent limitations to the types and forms that application presentations can take. For example, an interactive application might provide a web-based user interface. A reporting application might produce printed reports on various media. Another application might provide a data feed for consumption by yet another application.

Applications that operate on sampled data often need to provide indicators (such as visual cues) that results were produced on a subset of captured data instead of all of the data. The indicator interface 924 may therefore provide a communication channel between the packet forwarding apparatus 906 and the downstream processing stacks 908, 910, 912, 914 and applications 922. As a result of these indicators, the downstream components 908, 910, 912, 914, 922 can make appropriate processing decisions and provide relevant indicators to their users. On the other hand, if an application 922 is indifferent to whether or not data is sampled, the system 900 can be used transparently without downstream applications 922 requiring any modification.

It will often be useful for various components of the system 900 to share configuration parameters so that they can operate in synchronization with each other. For example, if the "bucketing" interval used in the data store 904 is thirty seconds, a real-time data packet forwarding path (or circuit) should operate on the same interval. Likewise, the downstream processing stacks 908, 910 and applications 922 may need to know the interval in the event they need to drill-down to data packets stored in the data store 904. As a result, a configuration interface 926 may be shared among the components of the system 900 for the purpose of setting and retrieving these types of configuration parameters (thereby ensuring consistency within the system 900).

The system 900 is designed for the simultaneous operation of multiple instances of data packet forwarding paths and processing stacks. For example, a Customer Care representative who is assisting a customer might need a dedicated query processing stream to drill-down to the data specific to that customer.

In some embodiments, the system 900 may simultaneously: a) Address real-time needs for reliable and immediate notification of major network traffic problems and management of network operations while also addressing non-real-time needs for complete processing of all data to support reporting for network and service planning and certain customer care applications; b) Scale the system's capabilities at least as fast as the rate of growth of customer traffic while limiting the growth in number of devices used by the system to better (less) than linear growth rates; and c) Maintain all captured data (no dropped data) for customer-defined durations while limiting growth in storage requirements and maintaining acceptable system response times.

What is claimed is:

1. A packet capture apparatus, comprising:
a data packet receiving interface;
a data packet forwarding interface;
a configuration interface; and
circuitry that implements a plurality of data packet forwarding paths between the data packet receiving interface and the data packet forwarding interface, the circuitry configuring at least one of the plurality of data packet forwarding paths in response to input received via the configuration interface, and the circuitry adaptively reconfiguring at least one of the plurality of data packet forwarding paths i) in response to the input received via the configuration interface, and ii) while data packets are being captured by the packet capture apparatus, wherein:
the circuitry implements a filtered data packet forwarding path, the filtered data packet forwarding path including a data packet filter; and
the circuitry is configured to receive input via the configuration interface and adaptively reconfigure at least one parameter of the data packet filter while data packets are being captured by the packet capture apparatus.

2. The packet capture apparatus of claim 1, wherein:
the data packet receiving interface comprises a real-time data packet receiving interface and a non-real-time data packet receiving interface; and
the circuitry implements at least one real-time data packet forwarding path and at least one non-real-time data packet forwarding path.

3. The packet capture apparatus of claim 2, wherein the at least one non-real-time data packet forwarding path comprises a non-real-time data packet forwarding path that forwards data that is automatically received at the non-real-time data packet receiving interface.

4. The packet capture apparatus of claim 2, wherein:
the circuitry comprises a query interface; and
the at least one non-real-time data packet forwarding path comprises a non-real-time data packet forwarding path that forwards data received at the non-real-time data packet receiving interface in response to queries issued by the query interface.

5. The packet capture apparatus of claim 1, further comprising a data packet store, wherein:
the data packet receiving interface comprises a real-time data packet receiving interface; and
the circuitry implements at least one real-time data packet forwarding path and at least one non-real-time data packet forwarding path, the real-time data packet forwarding path i) routing data packets received at the real-time data packet receiving interface to the data packet store, and ii) retrieving at least some of the data packets in the data store for forwarding to the data packet forwarding interface.

6. The packet capture apparatus of claim 1, wherein:
the data packet receiving interface comprises a real-time data packet receiving interface;

the circuitry implements a real-time sampled data packet forwarding path, the real-time sampled data packet forwarding path including a data packet sampling circuit; and the circuitry implements a real-time filtered data packet forwarding path, the real-time filtered data packet forwarding path including a data packet filter.

7. The packet capture apparatus of claim 1, wherein:

the circuitry implements a sampled data packet forwarding path, the sampled data packet forwarding path including a data packet sampling circuit; and the circuitry is configured to receive input via the configuration interface and adaptively reconfigure at least one parameter of the data packet sampling circuit while data packets are being captured by the packet capture apparatus.

8. The packet capture apparatus of claim 1, wherein the circuitry comprises a field-programmable gate array.

9. The packet capture apparatus of claim 1, wherein the circuitry comprises a microprocessor.

10. The packet capture apparatus of claim 1, further comprising a packet decoder coupled to the data packet receiving interface, wherein the circuitry implements a particular one of the plurality of data packet forwarding paths in response to configuration information, received via the configuration interface, indicating whether an output of the particular one of the data packet forwarding paths should include raw data packets or decoded data packets.

11. The packet capture apparatus of claim 1, further comprising a physical, network-connectable, data capture probe, the data capture probe being coupled to the data packet receiving interface.

12. A packet capture method, comprising:

in a packet capture apparatus:

receiving data packets derived from a physical, network-connectable, data capture probe;

receiving configuration information while receiving the data packets;

implementing a plurality of data packet forwarding paths, each of the data packet forwarding paths forwarding at least some of the received data packets to a respective one of a plurality of data packet outputs, the implementing including, implementing at least two of the data packet forwarding paths to forward data packets at different rates; and adaptively reconfiguring, while data packets are being captured by the packet capture apparatus, at least one of the plurality of data packet forwarding paths in response to the received configuration information, wherein implementing a plurality of data packet forwarding paths comprises, in response to the received configuration information, adaptively reconfiguring at least one parameter of a data packet filter.

13. The packet capture method of claim 12, wherein implementing a plurality of data packet forwarding paths comprises implementing a real-time data packet forwarding path and a non-real-time data packet forwarding path.

14. The packet capture method of claim 12, wherein implementing a plurality of data packet forwarding paths comprises defining a sampled data packet forwarding path and a filtered data packet forwarding path.

15. The packet capture method of claim 12, wherein implementing a plurality of data packet forwarding paths comprises, in response to the received configuration information, adaptively reconfiguring at least one parameter of a data packet sampling circuit.

16. The packet capture method of claim 12, wherein at least one of the plurality of data packet forwarding paths is implemented at least partly by a field-programmable gate array.

17. The packet capture method of claim 12, wherein at least one of the plurality of data packet forwarding paths is implemented at least partly by a microprocessor.

* * * * *